(12) United States Patent
Kobayashi et al.

(10) Patent No.: US 8,522,837 B2
(45) Date of Patent: *Sep. 3, 2013

(54) GAS CANISTER RETAINING STRUCTURE FOR GAS-ENGINE-MOUNTED WORKING MACHINE

(75) Inventors: Hideaki Kobayashi, Wako (JP); Masayuki Sasaoka, Wako (JP); Tomoki Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 365 days.

This patent is subject to a terminal disclaimer.

(21) Appl. No.: 12/343,668

(22) Filed: Dec. 24, 2008

(65) Prior Publication Data
US 2009/0159600 A1    Jun. 25, 2009

(30) Foreign Application Priority Data
Dec. 25, 2007    (JP) .................................. 2007-332270

(51) Int. Cl.
*B65B 1/04* (2006.01)

(52) U.S. Cl.
USPC ........................... 141/346; 220/562; 180/69.5

(58) Field of Classification Search
USPC .................. 141/346, 347, 351, 363–366, 375; 222/325–327, 182, 183; 220/260, 562
See application file for complete search history.

(56) References Cited

U.S. PATENT DOCUMENTS

| 3,189,016 | A | * | 6/1965 | Corlet | 126/38 |
| 5,465,861 | A | * | 11/1995 | Kunz et al. | 220/260 |
| 5,890,887 | A | * | 4/1999 | Adler | 431/344 |
| 6,530,399 | B2 | * | 3/2003 | Nguyen et al. | 141/2 |

FOREIGN PATENT DOCUMENTS

JP    11-170876 A    6/1999

* cited by examiner

*Primary Examiner* — Jason Boeckmann
*Assistant Examiner* — Joel Zhou
(74) *Attorney, Agent, or Firm* — Arent Fox LLP

(57) ABSTRACT

Gas canister retaining structure includes: a gas canister cover pivotable between an opened position for attaching/detaching a cassette gas canister to/from the retaining structure and a closed position for accommodating and holding the gas canister in place within the canister cover; a mouthpiece support section provided inside the gas canister cover for supporting a mouthpiece portion of the cassette gas canister with a jet nozzle of the cassette gas canister received in a nozzle receiving port provided in the mouthpiece support section; and a shutter member pivotable between an opened position for opening the nozzle receiving port and a closed position for closing the nozzle receiving port.

3 Claims, 13 Drawing Sheets

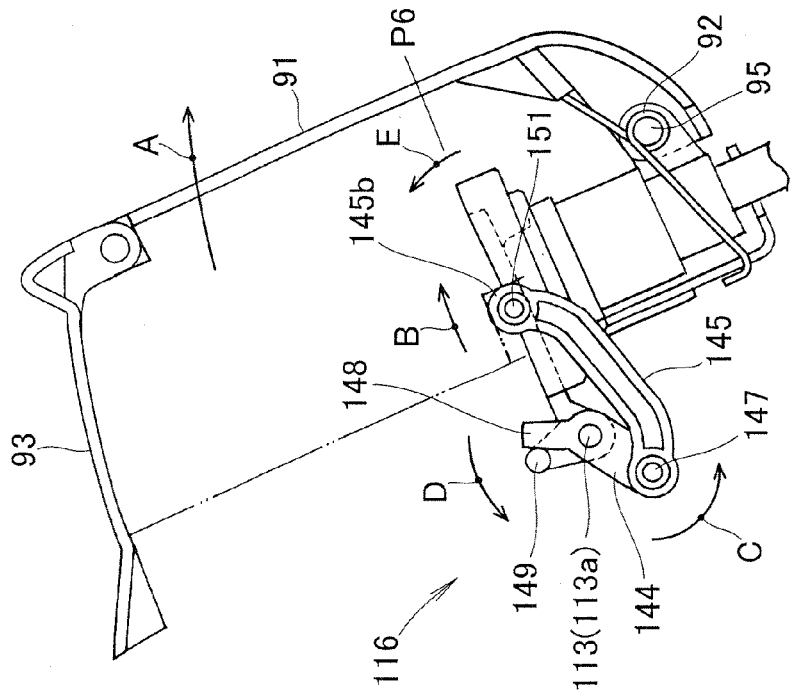
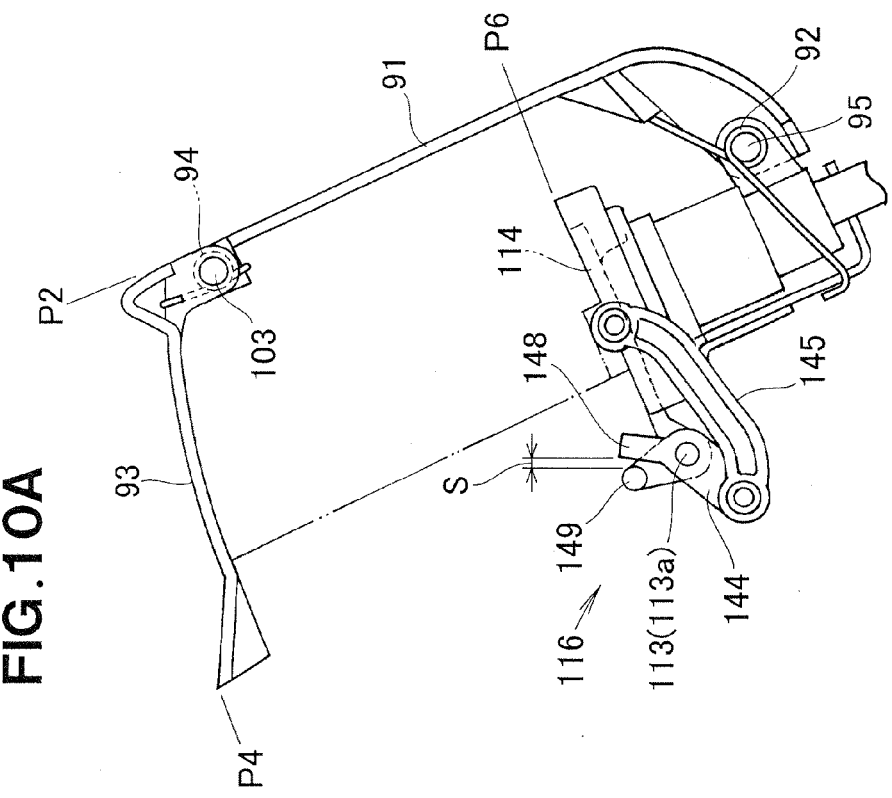

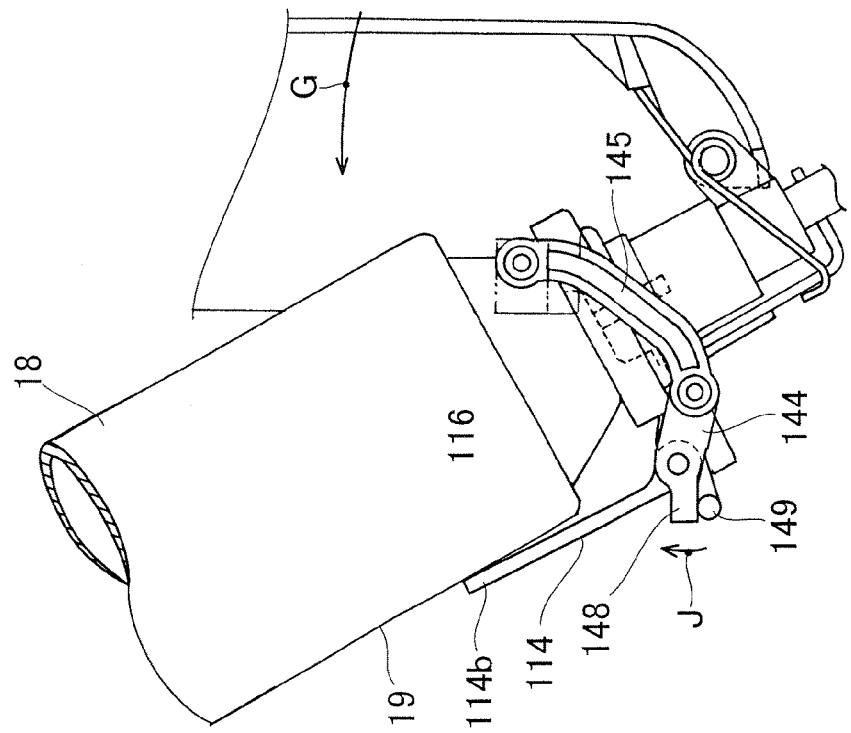
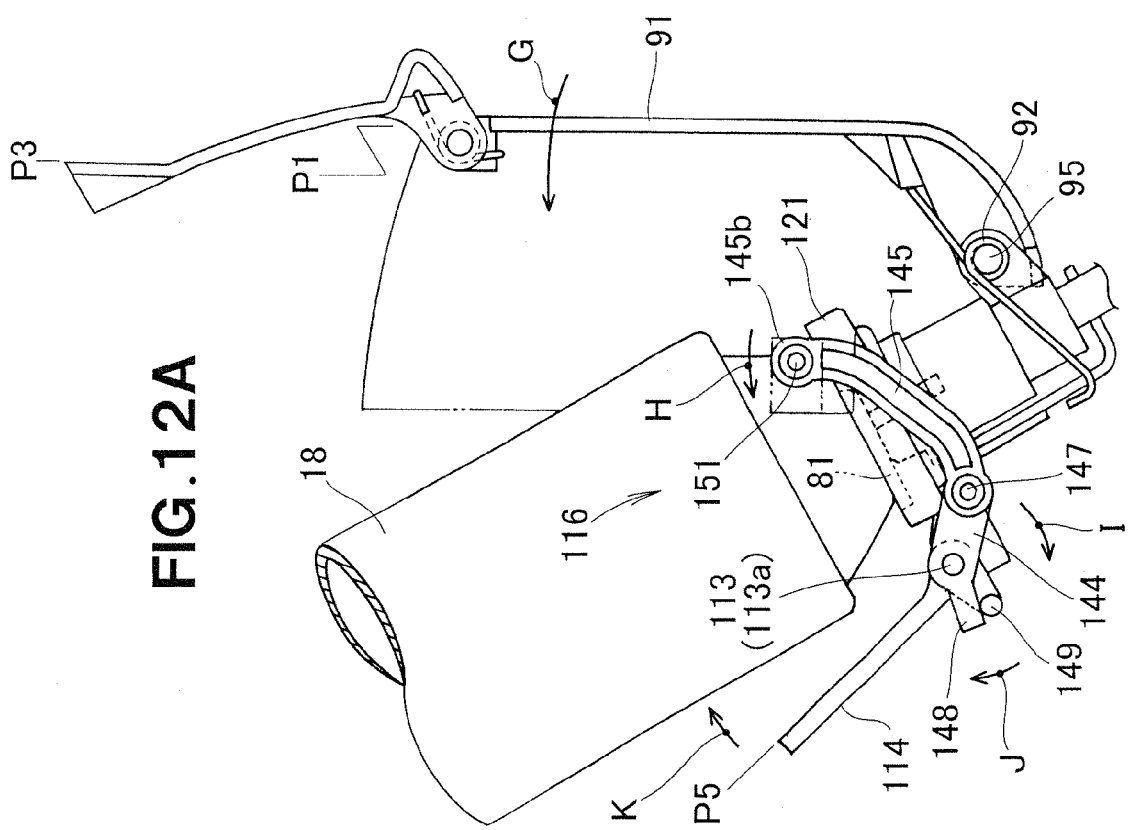
FIG.12A
FIG.12B

GAS CANISTER RETAINING STRUCTURE FOR GAS-ENGINE-MOUNTED WORKING MACHINE

FIELD OF THE INVENTION

The present invention relates to gas canister retaining structures for working machines having mounted thereon a gas engine that is supplied with fuel gas from a cassette gas canister.

BACKGROUND OF THE INVENTION

Among the conventionally-known working machines are ones which include a gas engine mounted on the machine body, a handle base extending rearwardly from the machine body and a hollow storage section provided in the handle base for accommodating a cassette gas canister, and in which the hollow storage section is closed with a gas canister cover. One example of such working machines is disclosed in Japanese Patent Application Laid-Open Publication No. HEI-11-170876 (JP 11-170876 A).

The gas-engine-mounted working machine of JP 11-170876 A includes a mouthpiece support section for supporting a mouthpiece portion of the cassette gas canister, and the mouthpiece support section has a nozzle receiving port for receiving a jet nozzle of the cassette gas canister. When not in use, the gas-engine-mounted working machine is stored with the cassette gas canister detached from the hollow storage section after the canister mouthpiece portion being detached from the mouthpiece support section. Therefore, during storage of the gas-engine-mounted working machine, foreign matter, such as dust, may undesirably enter, through hollow storage section, the nozzle receiving port. As a measure for avoiding such entry of foreign matter, it is conceivable to construct the entire hollow storage section into a highly sealed structure, which is, however, extremely difficult because the hollow storage section is a space relatively great in size.

SUMMARY OF THE INVENTION

In view of the foregoing prior art problems, it is an object of the present invention to provide an improved gas canister retaining structure for a gas-engine-mounted working machine which can reliably prevent foreign matter, such as dust, from entering the nozzle receiving portion.

In order to accomplish the above-mentioned object, the present invention provides an improved gas canister retaining structure for a gas-engine-mounted working machine provided with a gas engine that is supplied with fuel from a cassette gas canister, which comprises: a gas canister cover (or main cover) pivotable between an opened position for attaching/detaching the cassette gas canister to/from the gas canister retaining structure and a closed position for accommodating and holding the cassette gas canister in place within the gas canister cover; a mouthpiece support section provided inside the gas canister cover for supporting a mouthpiece portion of the cassette gas canister with a jet nozzle of the cassette gas canister received in a nozzle receiving port provided in the mouthpiece support section; and a shutter member pivotable between an opened position for opening the nozzle receiving port and a closed position for closing the nozzle receiving port.

After the cassette gas canister is detached from the gas canister retaining structure, the nozzle receiving port can be closed directly and hence reliably with the shutter member. Thus, it is possible to prevent, to some degree, foreign matter, such as dust, from entering the nozzle receiving port.

Preferably, the gas canister retaining structure of the present invention may further comprise an interlocking mechanism that causes the shutter member to be opened/closed in interlocked relation to opening/closing of the gas canister cover. By the provision of the interlocking mechanism, there is no need for a human operator to open/close the shutter member separately from the gas canister cover, which thereby greatly facilitates attachment/detachment of the cassette gas canister.

Preferably, the interlocking mechanism includes first and second links that interconnect the gas canister cover and the shutter member. As the gas canister cover is closed, the first and second links are collapsed so that the shutter member is closed, while, as the gas canister cover is opened, the first and second links are expanded so that the shutter member is opened. Thus, with the simple construction of the interlocking mechanism merely including the inner and outer links, the present invention can open/close the shutter member in interlocking relation to the opening/closing of the gas canister cover.

Preferably, the first link is pivotably provided on the gas canister cover and the second link is pivotably provided on the shutter member. As the gas canister cover is opened, a guide claw provided on the second link abuts against a driven pin, provided on the shutter member, so that the shutter member is opened, while, as the gas canister cover is closed, the guide claw moves away from the driven pin so that the shutter member is closed by a biasing force of a return spring. Generally, when the gas canister cover is to be closed after the cassette gas canister is attached to the retaining structure, the shutter would undesirably abut against the gas canister cover to prevent the gas canister cover from being pivotally moved toward its closed position. Thus, the interlocking mechanism in the present invention is constructed in such a manner that, as the gas canister cover is opened, the guide claw abuts against the driven pin so that the shutter member is opened, while, as the gas canister cover is closed, the guide claw moves away from the driven pin so that the shutter member is closed by the biasing force of the return spring. Consequently, the interlocking relationship between the gas canister cover and the shutter member can be canceled to allow only the gas canister cover to be closed; thus, the present invention can significantly enhance usability of the working machine.

Preferably, the gas canister cover and the shutter member are operatively interconnected via the interlocking mechanism in such a manner that opening/closing pivoting movement of the gas canister cover through a given angle causes opening/closing pivoting movement of the shutter member through a greater angle than the given angle. Thus, by opening the gas canister cover through only a small angle, the shutter member can be pivotally moved through a relatively great angle to its opened position evacuated from the cassette gas canister. On the other hand, by closing the gas canister cover through only a small angle, the shutter member can be pivotally moved through a relatively great angle to its closed position where it closes the nozzle receiving port. In this way, the present invention can facilitate the opening/closing operation of the gas canister cover. As a result, the present invention can even further enhance the usability of the working machine. Further, because the gas canister cover has to be opened through only a small angle, the present invention can reliably prevent foreign matter, such as dust, from getting into the gas canister cover.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIGS. 10A and 10B are views explanatory of how the main cover and shutter member are opened;

FIGS. 12A and 12B are views explanatory of behavior of the interlocking mechanism when the main cover is closed after the cassette gas canister is attached to the gas canister retaining structure.

DETAILED DESCRIPTION OF THE PREFERRED EMBODIMENTS

In the following description, the terms "front", "rear", "left" and "right" are used to refer to directions as viewed from a human operator. Whereas a walk-behind cultivating machine will hereinafter be described as a preferred embodiment of a gas-engine-mounted working machine of the present invention, the present invention is not limited to such a walk-behind cultivating machine.

Figure 1:
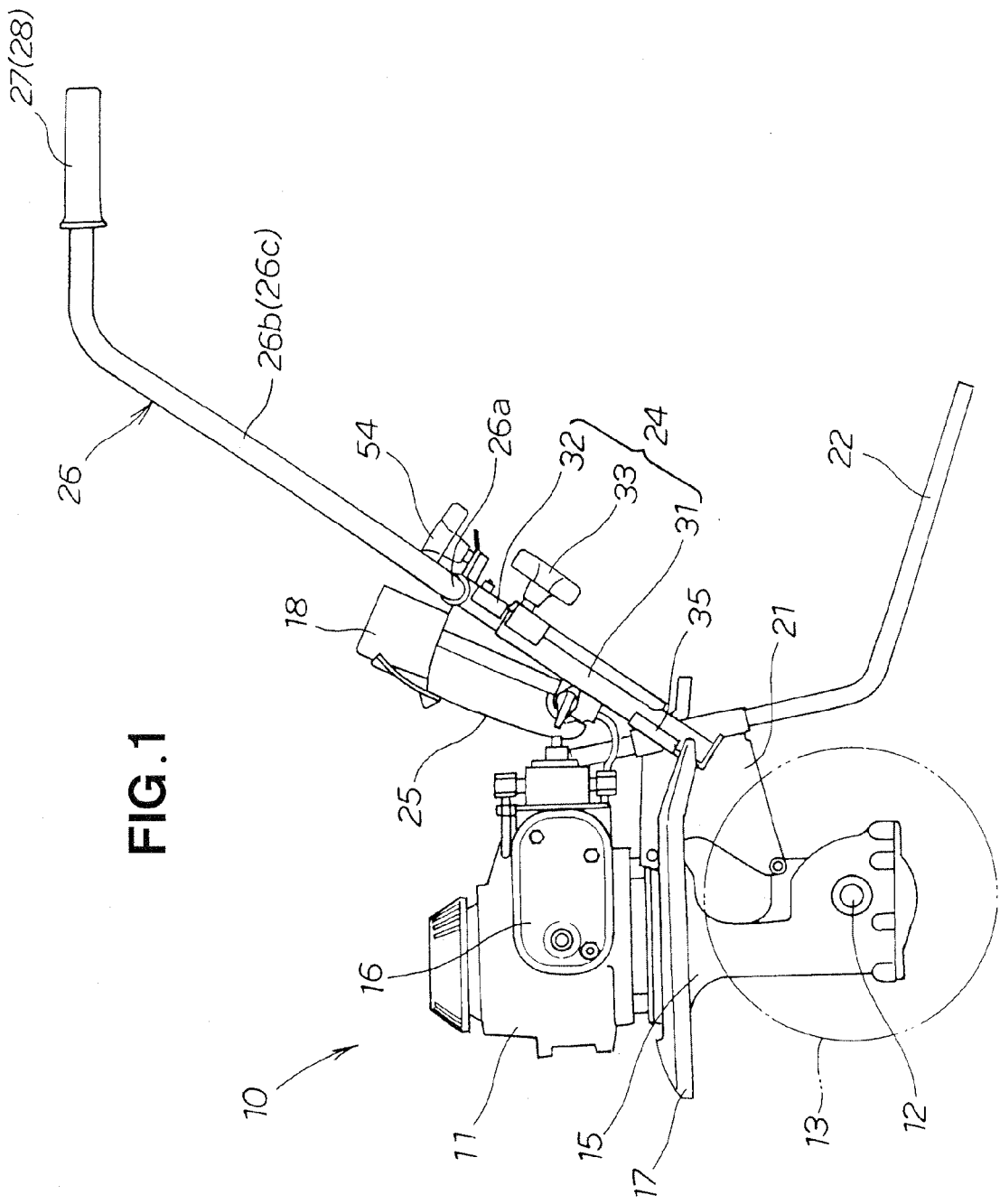
FIG. 1 is a side view showing a gas-engine-mounted working machine provided with an embodiment of a gas canister retaining structure of the present invention.

Reference is now made to FIG. 1 showing in side elevation a gas-engine-mounted working machine 10 provided with an embodiment of a gas canister retaining structure of the present invention. The gas-engine-mounted working machine 10 illustrated here is a walk-behind cultivating machine where driving power of a gas engine 11 is transmitted to a cultivating shaft 12, extending horizontally in a width direction of the machine body 18, to rotate the cultivating shaft 12 so that it can travel while cultivating the soil by means of a plurality of cultivating claws 13.

The gas-engine-mounted working machine 10 includes a gas engine 11 mounted on an upper end portion of a machine body 15, a fender 17 provided beneath the gas engine 11 via a cultivating shaft 12 extending horizontally in a width direction of the machine body 15, and the plurality of cultivating claws 13 disposed beneath the fender 17. The gas engine 11 is driven by fuel gas 85 (see FIG. 3) supplied from a cassette gas canister 18. Muffler 16 is provided to the left of the gas engine 11. The fender 17 is a cover designed to primarily prevent dispersion of the soil.

The gas-engine-mounted working machine 10 further includes a support bracket 21 fixed to the machine body 15, a resistance bar 22 fixed to the support bracket 21, a handle column unit 24 extending rearwardly and upwardly from the support bracket 21, a gas canister retaining structure 25 fixed to the handle column unit 24, the gas canister 18 mounted to the gas canister retaining structure 25, and an operating handle 26 mounted to an upper end portion of the handle column unit 24. The resistance bar 22 is a member for adjusting a soil cultivating depth of the plurality of cultivating claws 13.

Figure 2:
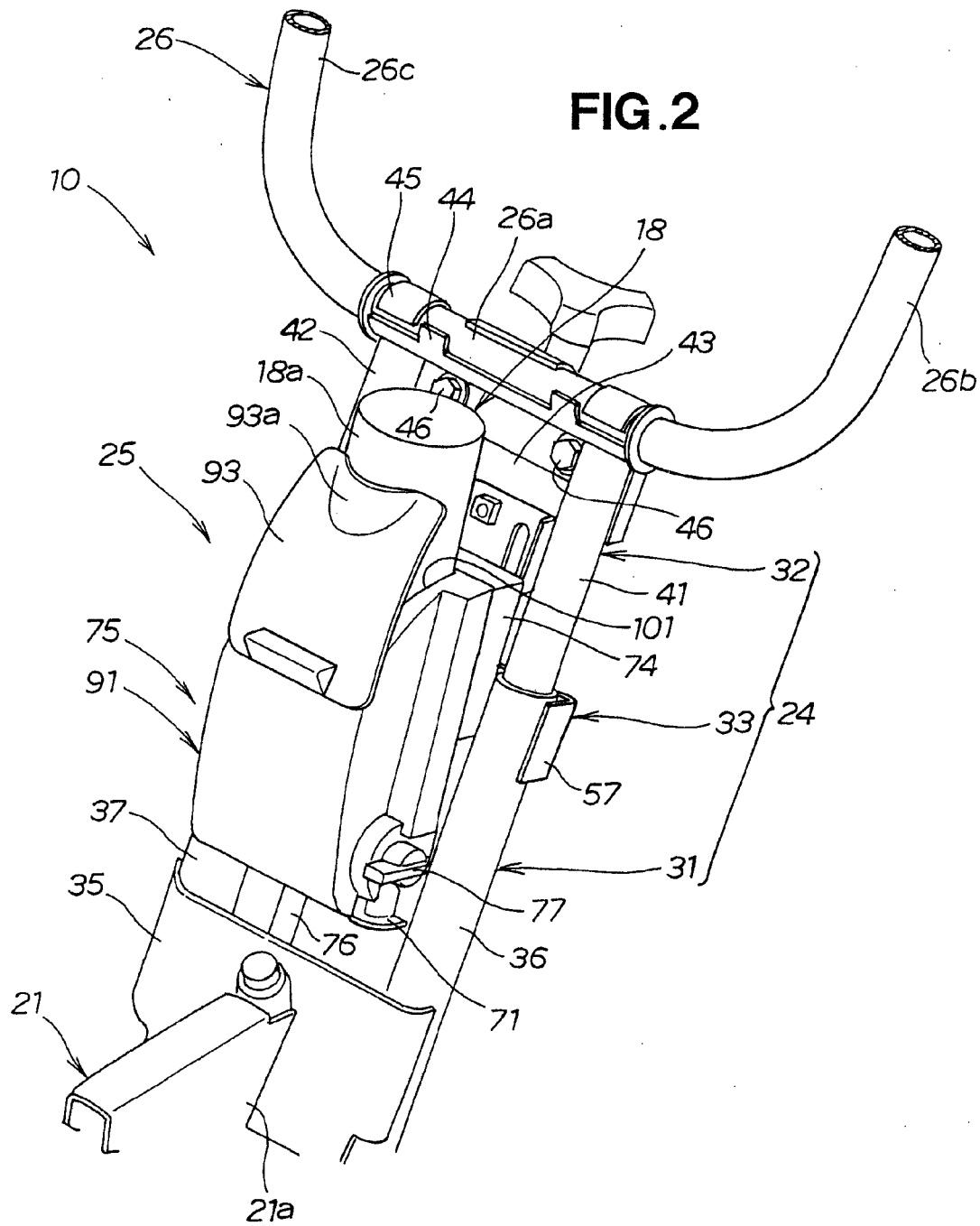
FIG. 2 is a perspective view of the gas-engine-mounted working machine provided with the gas canister retaining structure of the invention.

The operating handle 26 is a cylindrical member that has a substantially U overall shape as viewed from the front (see FIG. 2). The operating handle 26 has an intermediate, horizontal handle section 26a pivotably mounted to the upper end portion of the handle column unit 24, left and right handle sections 26b and 26c extending rearwardly and upwardly from the left and right ends, respectively, of the intermediate, horizontal handle section 26a, and left and right grips 27 and 28 provided on respective distal end portions of the left and right handle sections 26b and 26c.

Figure 3:
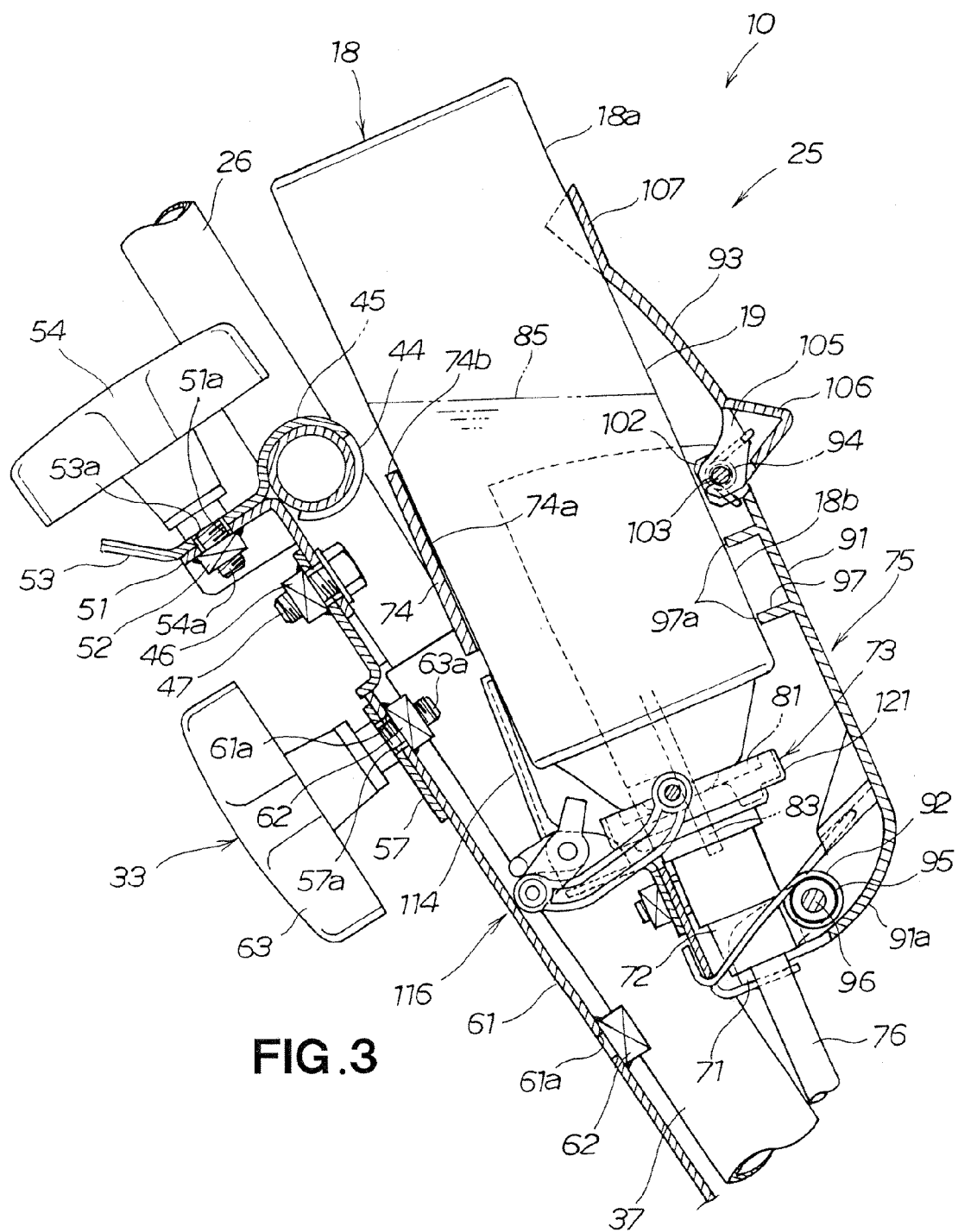
FIG. 3 is a sectional right side view of the gas canister retaining structure shown in FIG. 2.

FIG. 2 is a perspective view of the gas-engine-mounted working machine 10 provided with the gas canister retaining structure 25 of the invention, and FIG. 3 is a sectional right side view of the gas canister retaining structure 25.

More specifically, FIG. 2 shows the operating handle 26 held at its uppermost position with a liftable (i.e., vertically expandable/contractable) column 32 of the handle column unit 24 expanded upward, and FIG. 3 shows the operating handle 26 held at its lower most position with the handle column unit 24 lowered or contracted.

The handle column unit 24 further includes a fixed column 31 fixed to a rear end portion 21a of the support bracket 21 and having the liftable column 32 vertically movably mounted thereto, and a retainer 33 for retaining the liftable column 32 at a desired position.

The fixed column 31 includes a column retaining bracket 35 (see also FIG. 1) fixed to the rear end portion 21a of the support bracket 21, and left and right fixed post sections 36 and 37 fixed to left and right end portions of the column retaining bracket 35.

The left and right fixed post sections 36 and 37 are spaced from each other by a predetermined distance and have their respective lower end portions welded to the column retaining bracket 35. The left and right fixed post sections 36 and 37, each of which is in the form of a cylindrical pipe member, are disposed in left-right symmetric relation to each other with respect to the column retaining bracket 35, and the liftable column 32 is inserted in the left and right fixed post sections 36 and 37 in such a manner that it is vertically movable along the fixed post sections 36 and 37.

More specifically, the liftable column 32 has left and right liftable post sections 41 and 42 vertically movably inserted in (i.e. telescopically mounted to) the left and right fixed post sections 36 and 37, respectively, an liftable post connecting section 43 interconnecting respective upper end portions of the left and right liftable post sections 41 and 42, a handle support section 44 fixed to and spanning between the respective upper ends of the left and right liftable post sections 41 and 42, and a handle retaining member 45 that retains the operating handle 26 supported on the handle support section 44.

The left and right liftable post sections 41 and 42, each of which is in the form of a cylindrical pipe member, are disposed in left-right symmetric relation to each other. The intermediate, horizontal handle section 26a of the operating handle 26 is placed on the handle support section 44 and retained by the handle retaining member 45 from above. The handle retaining member 45 is fixed to the liftable post connecting section 43 by means of bolts 46 and nuts 47 (only one of which is shown in FIG. 3).

As shown in FIG. 3, the handle retaining member 45 has a locking plate section 51 formed between the left and right liftable post sections 41 and 42 (i.e., at a middle position in the width direction). The locking plate section 51 has a first locking hole 51a formed therein, and a locking nut 52 is disposed coaxially with the first locking hole 51a and welded to the underside surface of the locking plate section 51. Thus, the operating handle 26 is supported at the horizontal handle section 26a by the handle support section 44 and handle retaining member 45.

In the operating handle 26, a locking projection 53 projects from the intermediate, horizontal handle section 26a in opposed relation to the locking plate section 51 and has a second locking hole 53a formed therein.

The locking projection 53 is superposed on the locking plate section 51, and a locking screw 54 is inserted through the second locking hole 53a and first locking hole 51a. Threaded portion 54a of the locking screw 54, projecting out of the first locking hole 51a, is screwed to the locking nut 52, so that the operating handle 26 is retained in its predetermined use.

The liftable column 32 is retained at a predetermined height position by the retainer 33. The retainer 33 has a fixed post connecting section 57 interconnecting respective upper end portions of the left and right fixed post sections 36 and 37, a first retaining hole 57a formed in a substantial middle region of the fixed post connecting section 57, a slide plate 61 extending downward from the liftable post connecting section 43, and a plurality of second retaining holes 61a formed in the slide plate 61 at predetermined vertical intervals. A plurality of retaining nuts 62 are disposed coaxially with the respective second retaining holes 61a and welded to the rear surface of the slide plate 61. As an example, the second retaining holes 61a are formed in three positions, e.g. upper, middle and lower positions, of the slide plate 61. Only the second retaining holes 61a formed in the upper and middle positions of the slide plate 61 are shown in FIG. 3.

By the liftable column 32 being retained at its lowermost position, the operating handle 26 is retained at its lowermost position with the second retaining hole 61a, formed in the upper position of the slide plate 61, is aligned coaxially with the first retaining hole 57a of the retainer 33 as shown in FIG. 3.

Retaining screw 63 is inserted through the coaxially-aligned first retaining hole 57a and second retaining hole 61a, and a threaded portion 63a of the retaining screw 63, projecting out of from the second retaining hole 61a, is screwed to the retaining nut 62, so that the liftable column 32 (and hence the operating handle 26) is retained at the lowermost position.

By the liftable column 32 being raised to its middle position, the second retaining hole 61a, formed in the middle position of the slide plate 61, is aligned coaxially with the first retaining hole 57a of the retainer 33. Thus, the liftable column 32 (and hence the operating handle 26) is retained at its middle position higher than the lowermost position by means of the retaining screw 63 and retaining nut 62.

Further, by the liftable column 32 being raised to its uppermost position, the second retaining hole 61a, formed in the lower position of the slide plate 61, is aligned coaxially with the first retaining hole 57a of the retainer 33. Thus, the liftable column 32 (and hence the operating handle 26) is retained at its uppermost position by means of the retaining screw 63 and retaining nut 62.

The gas canister retaining structure 25 is fixed to the handle column unit 24. The cassette gas canister 18 is a commercially-available gas canister where the liquid fuel gas 85, preferably liquefied butane consisting primarily of butane, is filled in its container 19. As shown in FIG. 3, the cassette gas canister 18 has a jet nozzle 83 projecting out of a mouthpiece portion 81 of the container 19. With the nozzle 83 pressed into the container 19, the liquid fuel gas 85 can be led out through the nozzle 83.

Figure 4:
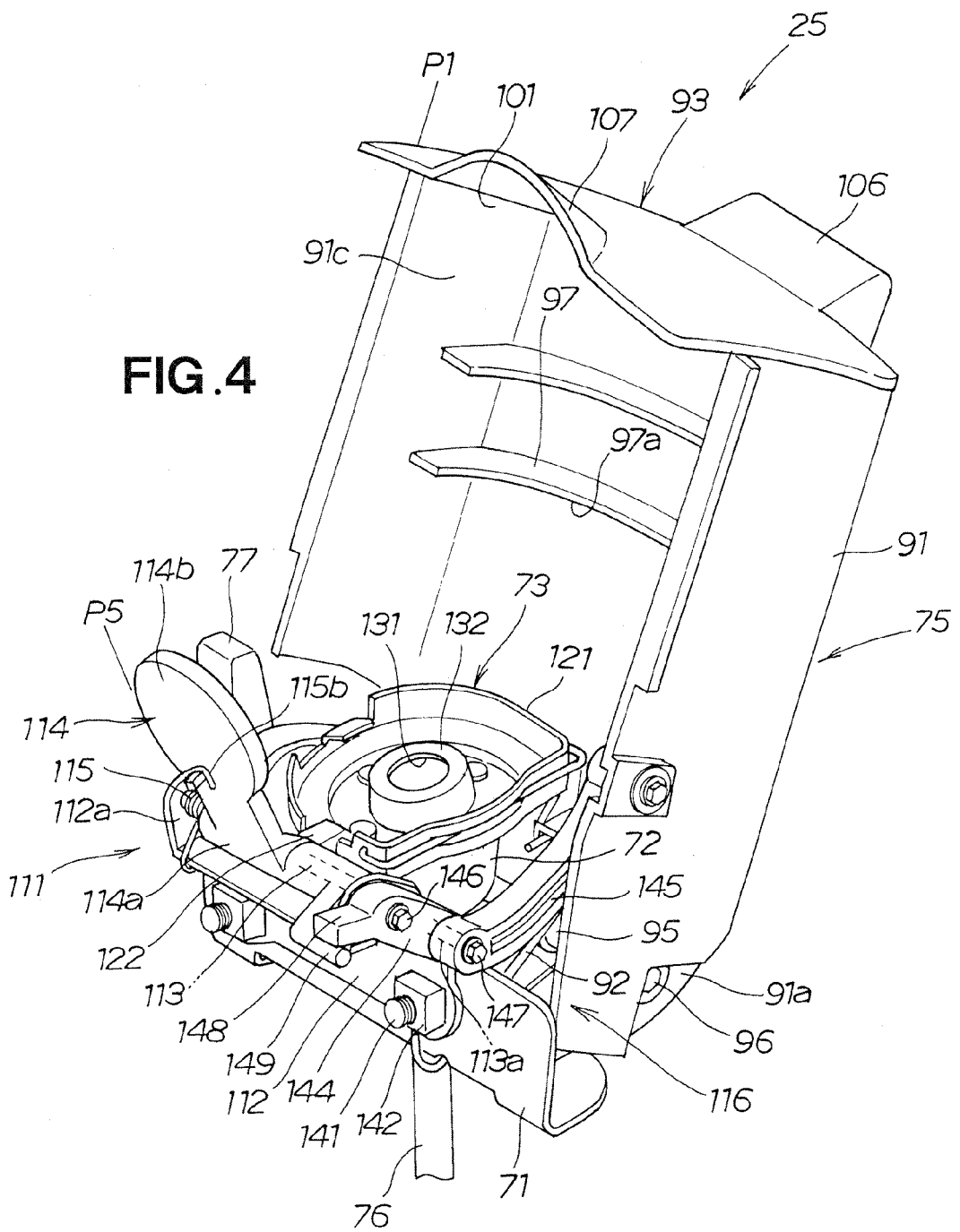
FIG. 4 is a perspective view showing the gas canister retaining structure when a main cover thereof is in its opened position.
Figure 5:
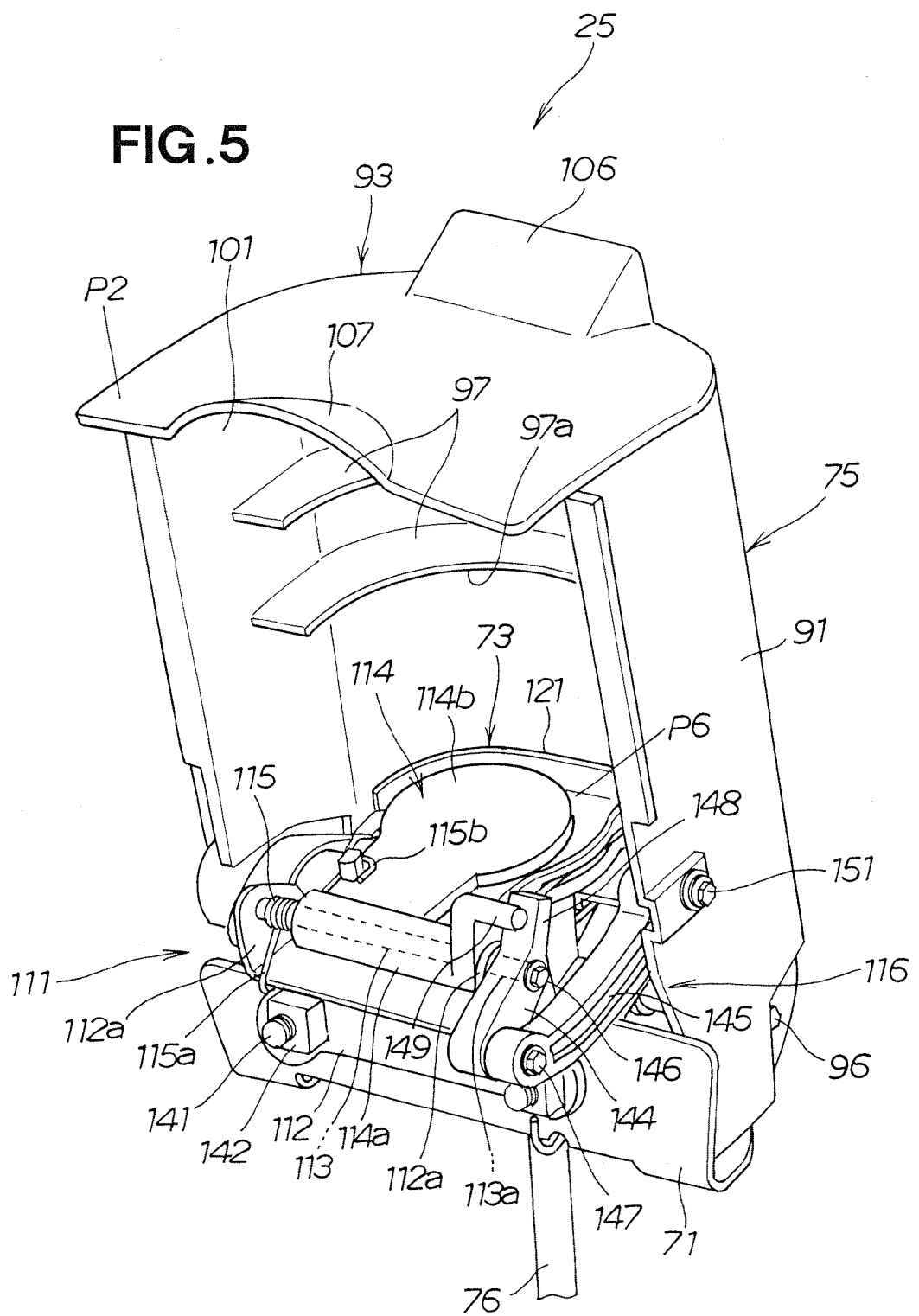
FIG. 5 is a perspective view showing the gas canister retaining structure when the main cover is in its closed position.
Figure 6:
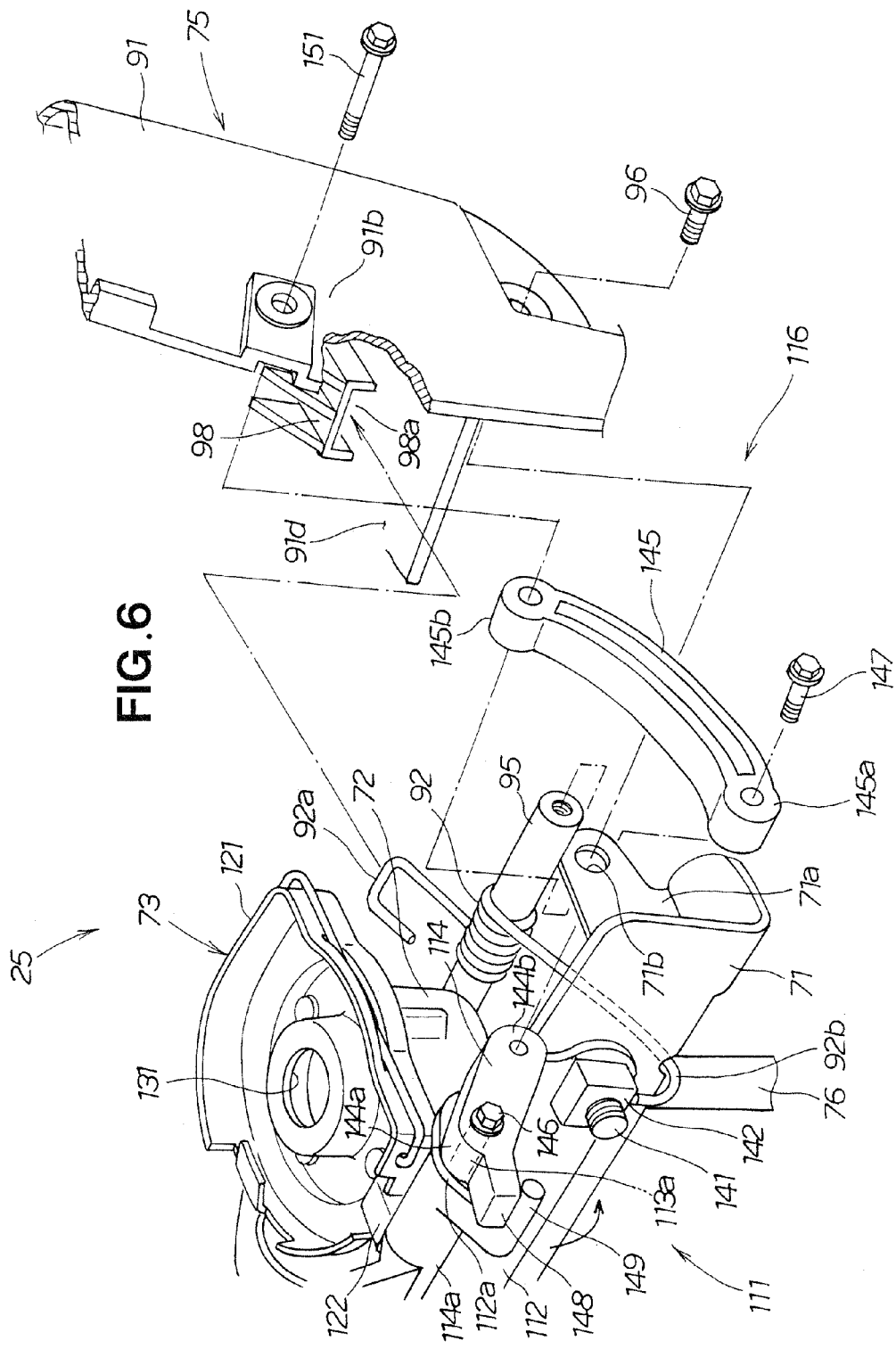
FIG. 6 is an exploded perspective view showing the gas canister retaining structure when the main cover is in the opened position.

FIG. 4 is a perspective view showing the gas canister retaining structure 25 when a main cover thereof is in its opened position, FIG. 5 is a perspective view showing the gas canister retaining structure 25 when the main cover is in its closed position, and FIG. 6 is an exploded perspective view showing the gas canister retaining structure 25 when the main cover thereof is in the opened position.

The gas canister retaining structure 25 includes an adaptor bracket 71 disposed between the left and right fixed post sections 36 and 37 shown in FIG. 2, an opening/closing valve 72 provided on the adaptor bracket 71, an adaptor unit 73 connected to the opening/closing valve 72, a gas canister holder 74 disposed above the adaptor unit 73, a gas canister cover unit 75 openably and closably mounted to the adaptor bracket 71, and a shutter unit 111 for opening/closing a nozzle receiving port 131 formed in a ring-shaped table portion 132 of the adaptor unit 73.

The opening/closing valve 72 has a supply port (not shown) formed in its lower portion communicating with a fuel passage 76 for leading the liquid fuel gas 85 (see FIG. 3), and a switching knob 77 (FIG. 4) is attached to a left side portion of the valve 72. By operation of the switching knob 77, the liquid fuel gas 85 lead to the opening/closing valve 72 through the jet nozzle 83 of the cassette gas canister 18 can be directed to the fuel passage 76.

The adaptor unit 73 is disposed in a substantial middle region, in the width direction, between the left and right fixed post sections 36 and 37. The adaptor unit 73 includes a mouthpiece support section 121 for supporting the mouthpiece portion 81 (FIG. 3) of the cassette gas canister 18, and a mouthpiece locking section 122 for holding the mouthpiece portion 81, supported by the mouthpiece support section 121, in a locked position.

The mouthpiece support section 121 is provided within the gas canister cover unit 75 (more specifically, within the main cover 91), and it supports the mouthpiece portion 81 received in the nozzle receiving port 131.

Figure 7A:
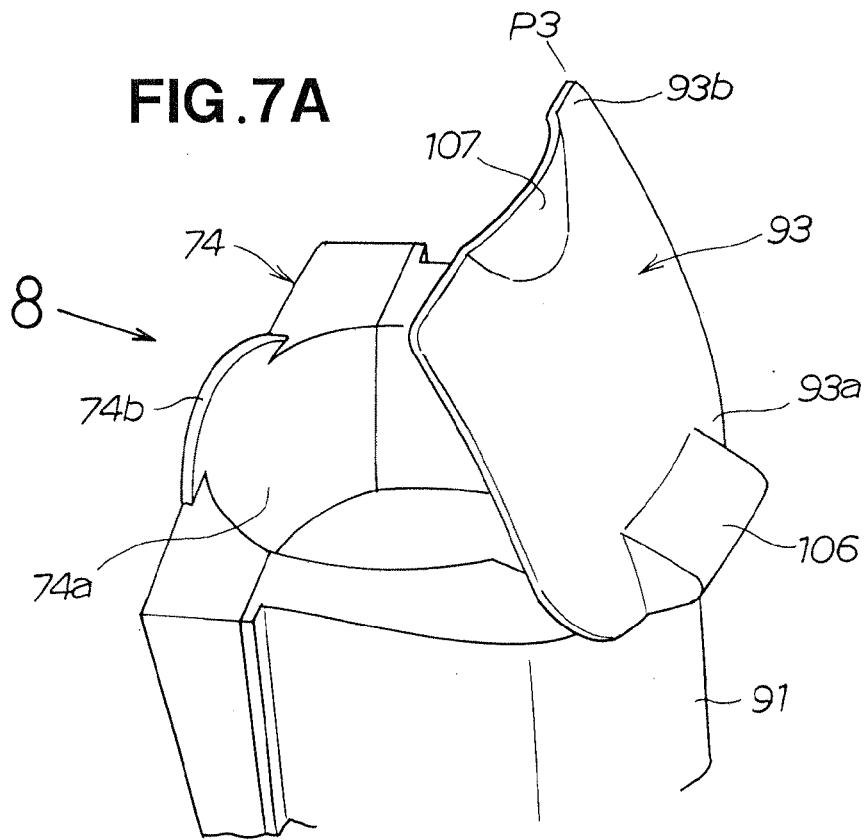
FIGS. 7A and 7B are perspective views showing a sub cover of the gas canister retaining structure.

The gas canister holder 74 shown in FIG. 3 is disposed between the left and right fixed post sections 36 and 37 and has a generally arcuately curved recessed portion 74a facing, and corresponding in shape to, a rear wall portion of the cassette gas canister 18 as seen in FIG. 7A. The gas canister holder 74 also has an upwardly curved protruding portion 74b formed on its middle upper end region. The rear wall portion of the container 19 of the cassette gas canister 18 is abuttingly supported by the arcuately-curved recessed portion 74a.

The gas canister cover unit 75 is disposed between and extends along the left and right handle post sections 36 and 37 so as to not only cover a substantial lower half portion 18b (see FIG. 3) of the cassette gas canister 18 but also support the cassette gas canister 18.

The gas canister cover unit 75 includes the main cover (gas canister cover) 91 openably and closably supported on the adaptor bracket 71, a main spring member 92 for holding the main cover 91 in a closed position, a sub cover 93 openably/closably supported on an upper end portion of the main cover, and a sub spring member 94 (FIG. 8) for holding the sub cover 93 in a closed position.

The main cover 91, which has the cassette gas canister 18 accommodated therein, is disposed in opposed relation to the gas canister holder 74 (see FIG. 3). The main cover 91 has its lower end portion 91a pivotably mounted on a main pivot shaft 95 by means of a bolt 96, so that the main cover 91 is pivotable between an opened position P1 and a closed position P2. The opened position P1 is where the cassette gas canister 18 can be attached and detached to and from the gas canister holder 74, and the closed position P2 is where the cassette gas canister 18 is duly accommodated in the main cover 91.

The main pivot shaft 95 is supported at its left and right ends in left and right mounting holes 71b (only the right mounting hole 71a is shown) formed in left and right side wall portions 71a (only the right side wall portion is shown) of the adapter bracket 71.

Further, the main cover 91 has a plurality of ribs 97 formed on its inner surface 91c, and each of the ribs 97 has a generally crescent shape as viewed in plan and extends horizontally along the inner surface 91c. The plurality of ribs 97 formed on the inner surface 91c can secure a sufficient rigidity of the main cover 91.

Further, distal end edges of the ribs 97 of the plurality of ribs 97 formed on the inner surface 91c are kept abutted against the container 19 of the cassette gas canister 18 while the main cover 91 is in the closed position, as shown in FIG. 3. In this way, the cassette gas canister 18 can be reliably pressedly held in place. In addition, the plurality of ribs 97 formed on the inner surface 91c can catch foreign matter, such as dust, having entered into the main cover 91 through an upper end opening 101 (see also FIG. 8) and thereby prevent such foreign matter from undesirably falling down to the nozzle receiving port 131.

As shown in FIG. 6, a spring engaging portion 98 is formed on a bottom portion 91d of the main cover 91, and the main spring member 92 provided on the pivot shaft 95 has one end portion 92a fitted in the spring engaging portion 98 and another end portion 92b engaged by the adaptor bracket 71. The main spring member 92 normally urges the main cover 91 in the closed position.

Figure 7B:
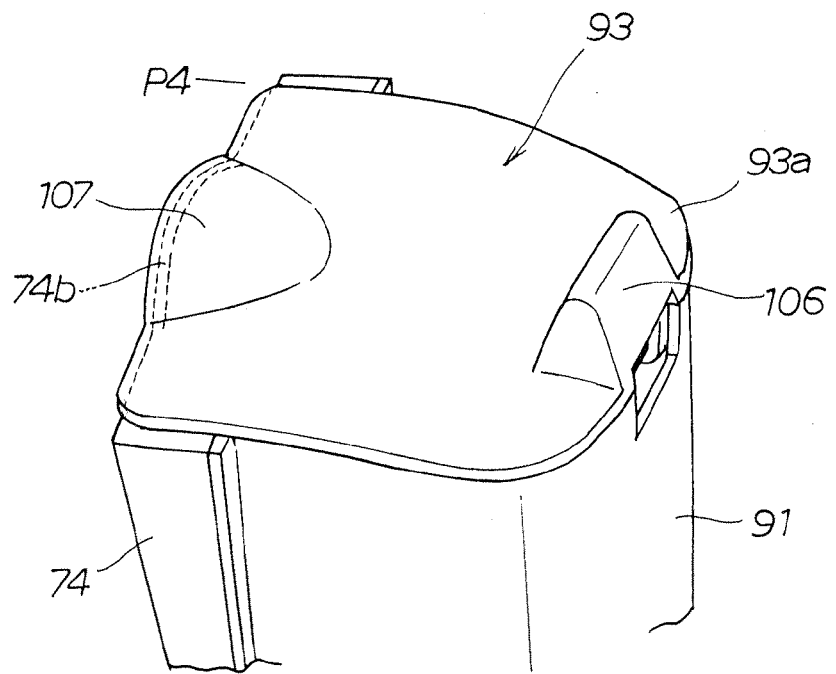
Figure 8:
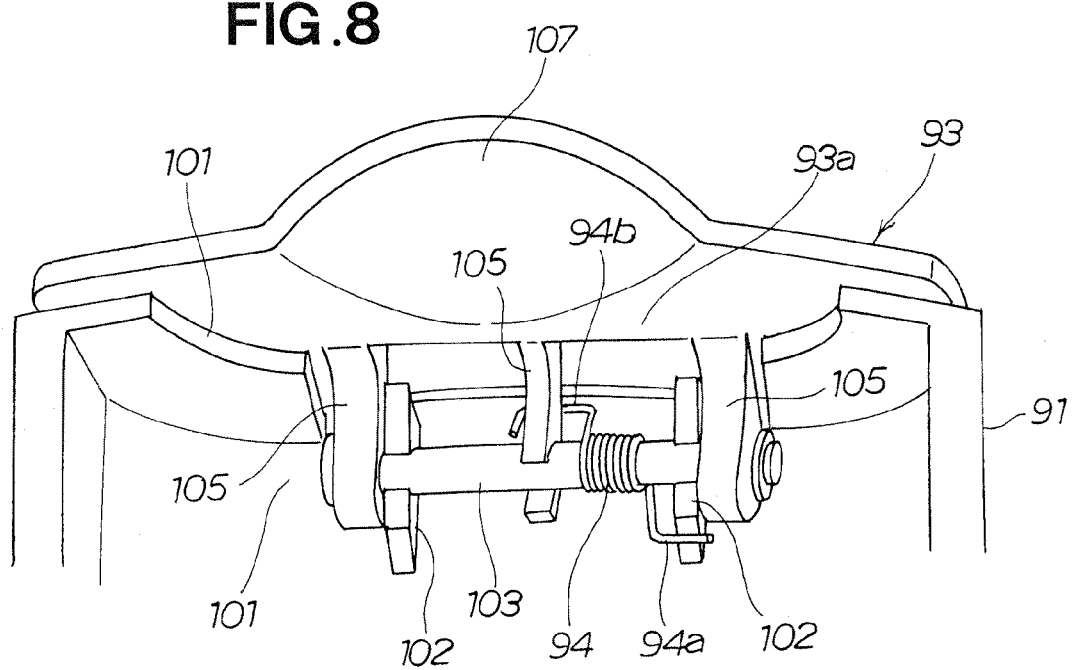
FIG. 8 is a view as seen in the direction of arrow 8 of FIG. 7A.

FIGS. 7A and 7b are perspective views showing the sub cover 93 of the gas canister retaining structure 25, and FIG. 8 is a view taken in a direction of arrow 8 of FIG. 7A.

The sub cover 93 is pivotable between an opened position P3 and a closed position P4. As shown in FIG. 8, two supporting blocks 102, spaced apart from each other in the width direction of the machine body, are formed on the inner surface of the main cover 91 and project into the above-mentioned upper end opening 101. Sub pivot shaft 103 is pivotably supported at its opposite end portions by the supporting blocks 102, and three arms 105 are formed integrally with the inner surface of a proximal end portion 93a of the sub cover 93 and pivotably mounted on the sub pivot shaft 103.

Sub spring member 94 is mounted on the sub pivot shaft 103. The sub spring member 94 has one end portion 94a engaged by one of the support blocks 102 and another end portion 94b engaged by one of the arms 105. The sub spring member 94 normally urges the sub cover 93 to hold the sub cover 93 in the closed position.

As shown in FIG. 7, the sub cover 93 has an outward protrusion 106 of a generally triangular sectional shape formed on the outer surface of the proximal end portion 93a, and an outwardly curved protrusion 107 formed on the outer surface of a distal end portion 93b thereof.

The triangular outward protrusion 106 is provided for the human operator to impart thereto a force to open the sub cover 93 against the biasing force of the sub spring member 94. The outwardly curved protrusion 107 is formed to contact a substantial upper-half portion 18a of the gas canister 18 over a great range.

Thus, using the biasing force of the sub spring member 94, the cassette gas canister 18 can be pressedly held in place by the entire region of the curved protrusion 107. In this way, the sub cover 93 can reliably prevent vibration of the cassette gas canister 18 that may occur during operation of the gas-engine-mounted working machine 10.

The gas canister holder 74 has the upwardly curved protruding portion 74b formed on its middle upper end region, as noted above. When the sub cover 93 is in the closed position as shown in FIG. 7B, the outwardly curved protrusion 107 is held in abutment against the upwardly protruding portion 74b. In this way, it is possible to prevent a gap from being formed between the outwardly curved protrusion 107 and the upwardly protruding portion 74b and thereby achieve an enhanced fluid-tightness within the main cover 91.

Referring back to FIGS. 4 and 5, the shutter unit 111 includes: a shutter bracket 112 fixed to the adaptor bracket 71; a shutter member 114 pivotably mounted on the shutter bracket 112 via a shutter pivot shaft 113; a shutter spring member (return spring) 115 for normally urging the shutter member 114 to a closed position P6; and an interlocking mechanism 116 for interlocking the shutter member 114 to the main cover 91 of the gas canister cover unit 75.

The shutter bracket 112 is secured to an upper end portion of the adaptor bracket 71 by a bolt 141 and nut 142. The shutter member 114 has a body portion 114a pivotably supported on left and right mounting portions 112a of the shutter bracket 112 via the shutter pivot shaft 113. Namely, the shutter member 114 is pivotable about the shutter pivot shaft 113 between an opened position P5 and a closed position P6. The opened position P5 is a position for opening the nozzle receiving port 131 of the mouthpiece support section 121, and the closed position P6 is a position for closing the nozzle receiving port 131 with the shutter member 114.

The shutter member 114 has a distal end portion 114b formed in a to disk shape. When the shutter member 114 is in the closed position P6, the distal end portion 114b is placed on the ring-shaped table portion 132. The distal end portion 114b thus placed on the table portion 132 can close the nozzle receiving port 131.

As shown in FIG. 5, the shutter spring member 115 is provided on a left end portion of the shutter pivot shaft 113, and it is engaged at one end 115a by the shutter bracket 112 and at the other end 115b by the shutter member 114. The shutter spring member 115 normally urges the shutter member 114 toward the closed position P6 to normally hold the shutter member 114 in the closed position P6. The shutter spring member 115 thus held in the closed position P6 can reliably close the nozzle receiving port 131 of the mouthpiece support section 121. Thus, after detachment from the cassette gas canister 18, the nozzle receiving port 131 can be closed directly with the shutter member 114, so that the nozzle receiving port 131 can be closed reliably.

Further, by the provision of the main cover 91 and shutter member 114, it is possible to prevent, to some degree, foreign matter, such as dust, from getting into the cover. By the shutter member 114 reliably closing the nozzle receiving port 131 and the main cover 91 preventing foreign matter, such as dust, from getting into the cover 91, the instant embodiment can reliably prevent foreign matter from entering the nozzle receiving port 131.

Figure 9:
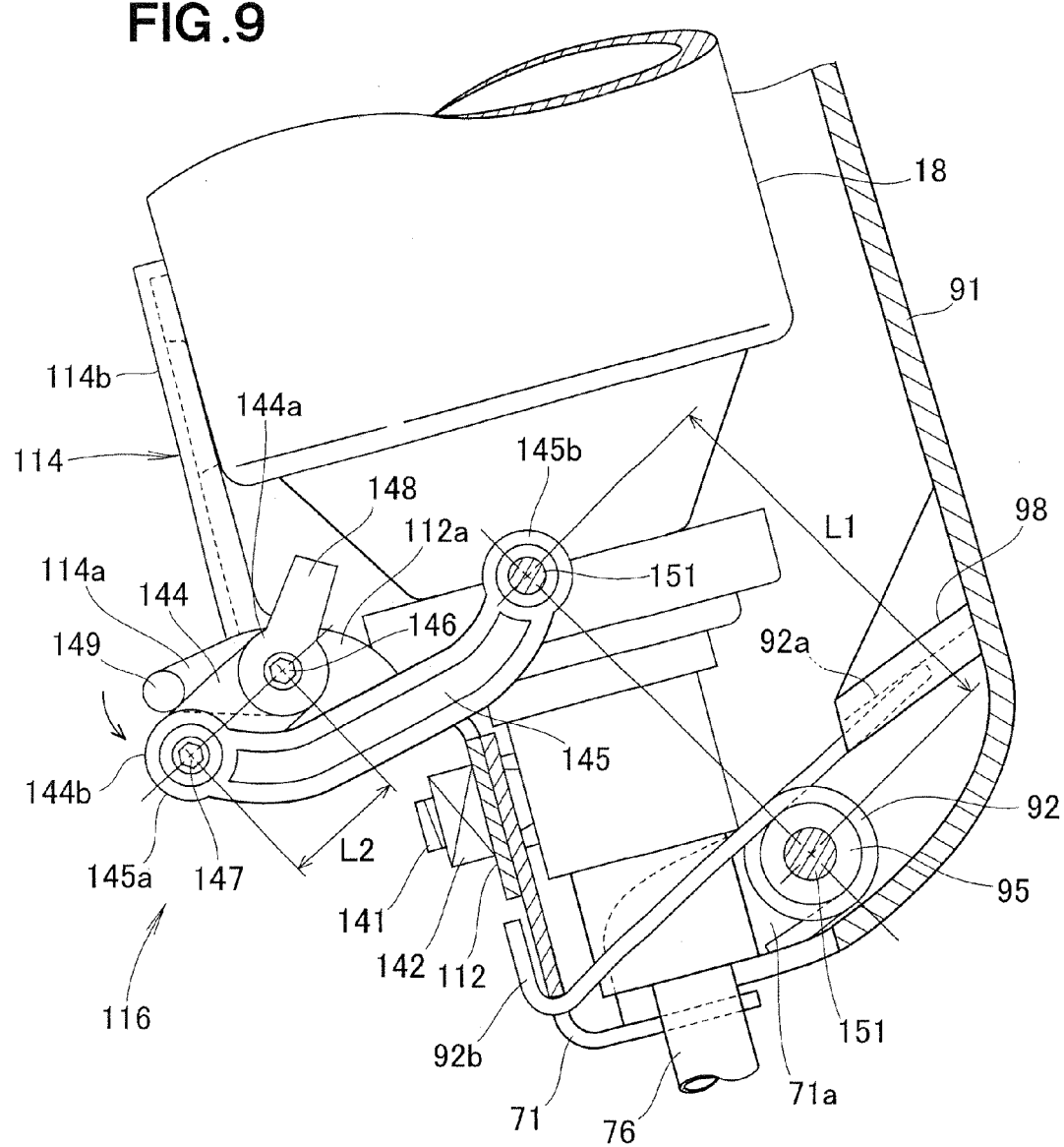
FIG. 9 is a side view showing an interlocking mechanism of the gas canister retaining structure of the invention.

FIG. 9 is a side view showing the interlocking mechanism 116 of the gas canister retaining structure 25, which includes an outer link (first link) 145 and inner link (second link) 144 interconnecting the shutter member 114 and the main cover 91 for interlocking movement of the two 114 and 91.

The inner link 144 is pivotably supported at its proximal end portion 144a to a right end portion 113a of the shutter pivot shaft 113 by means of a bolt 146 and pivotably connected at its distal end portion 144b to a distal end portion 145a of the outer link 145 by means of a bolt 147.

Guide claw 148 projects from the proximal end portion 144a of the inner link 144, and this guide claw 148 guides a driven pin 149 in an arrowed direction. The driven pin 149 is formed integrally with the proximal end portion 114a of the shutter member 114.

The outer link 145 is pivotably connected at the distal end portion 145a to the distal end portion 144b of the inner link 144 by means of the bolt 147 as noted above, and it is connected at its proximal end portion 145b to a right side wall portion 91b of the main cover 91 by means of a bolt 151.

The outer link 145 is formed in a downwardly curved shape in order to avoid interference with the bolt 146 when the main cover 91 is closed.

As the main cover 91 is closed, the inner and outer links 144 and 145 are collapsed to close the shutter member 114, while, as the main cover 91 is opened, the inner and outer links 144 and 145 are expanded to open the shutter member 114. Namely, with the interlocking mechanism 116, the shutter member 114 can be opened and closed in interlocking relation to opening and closing of the main cover 91.

In the aforementioned manner, the instant embodiment can eliminate a need for the human operator to open and close the shutter member 114, to thereby facilitate the operation for attaching/detaching the cassette gas canister 18 to/from the retaining structure 25. In addition, with the simple construction of the interlocking mechanism 116 only including the inner and outer links 144 and 145, the instant embodiment can open and close the shutter member 114 in interlocking relation to the opening and closing of the main cover 91.

Further, as shown in FIG. 9, the center of the main pivot shaft 95 is spaced from the center of the bolt 151 by a distance L1, and the center of the shutter pivot shaft 113 (bolt 146) is spaced from the center of the bolt 147 by a distance L2. Here, the distance L1 is about three times as great as the distance L2.

Thus, the opening/closing angle of the main cover 91 can be reduced to about one third of that of the shutter member 114. Namely, the main (gas canister) cover 91 and said shutter member 114 are operatively interconnected via the interlocking mechanism 116 in such a manner that opening/closing pivoting movement of the main cover 91 through a given angle causes opening/closing pivoting movement of the shutter member 114 through a greater angle than the given angle. Thus, by opening the main cover 91 through only a small angle, the shutter member 114 can be pivotally moved through a relatively great angle to the opened position P5 evacuated from the cassette gas canister 18 (see FIG. 4). On the other hand, by closing the main cover 91 through only a small angle, the shutter member 114 can be pivotally moved through a relatively great angle to the closed position P6 where it closes the nozzle receiving port 131 (see FIG. 5). In this way, the instant embodiment can facilitate the opening/closing operation of the main cover 91.

In addition, because of the interlocking relationship between the shutter member 114 and the main cover 91 such that opening/closing pivotal movement of the main cover 91 through a given angle can cause opening/closing pivotal movement of the shutter member 114 through a greater angle, the cassette gas canister 18 can be attached or detached to or from the gas canister retaining structure 25 by the human operator opening the main cover 91 through only a small angle. Because the main cover 91 has to be opened through only a small angle, the instant embodiment can reliably prevent foreign matter, such as dust, from getting into the main cover 91. Behavior of the interlocking mechanism 116 will be detailed later with reference to FIGS. 10-13.

With reference to FIGS. 10-12, a description will be given about how the cassette gas canister 18 is attached to the gas canister retaining structure 25. FIGS. 10A and 10B are views explanatory of how the main cover 91 and shutter member 114 are opened.

As seen in FIG. 10A, the main cover 91 is normally held in the closed position P2 by the biasing force of the main spring member 92, and the sub cover 93 is held in the closed position P4 by the biasing force of the sub spring member 93. Further, the shutter member 114 is held in the closed position P6 by the biasing force of the shutter spring member 115. In the aforementioned state, the inner and outer links 144 and 145 are in the collapsed position, and the guide claw 148 of the inner link 144 is located at a predetermined distance S from the driven pin 149.

As shown in FIG. 10B, the main cover 91 is caused to pivot about the main pivot shaft 95 in a direction of arrow A by the human operator pulling forward the main cover 91 against the biasing force of the main spring member 92. As the main cover 91 pivots in the arrow A direction, the proximal end portion 145b of the outer link 145 angularly moves together with the main cover 91 via the bolt 151 as indicated by arrow B.

In response to such movement of the outer link 145, the inner link 144 pivots about the shutter pivot shaft 113 (i.e., right end portion 113a of the shutter pivot shaft 113) in a direction of arrow C. Further, by such pivoting movement of the inner link 144, the guide claw 148 moves as indicated by arrow D to abut against the driven pin 149, so that the driven pin 149 moves in the arrow D direction. As a consequence, the shutter member 114 pivots, against the shutter spring member 115 (see FIG. 5), about the shutter pivot shaft 113 from the closed position P6 toward the opened position as indicated by arrow E.

Figure 11B:
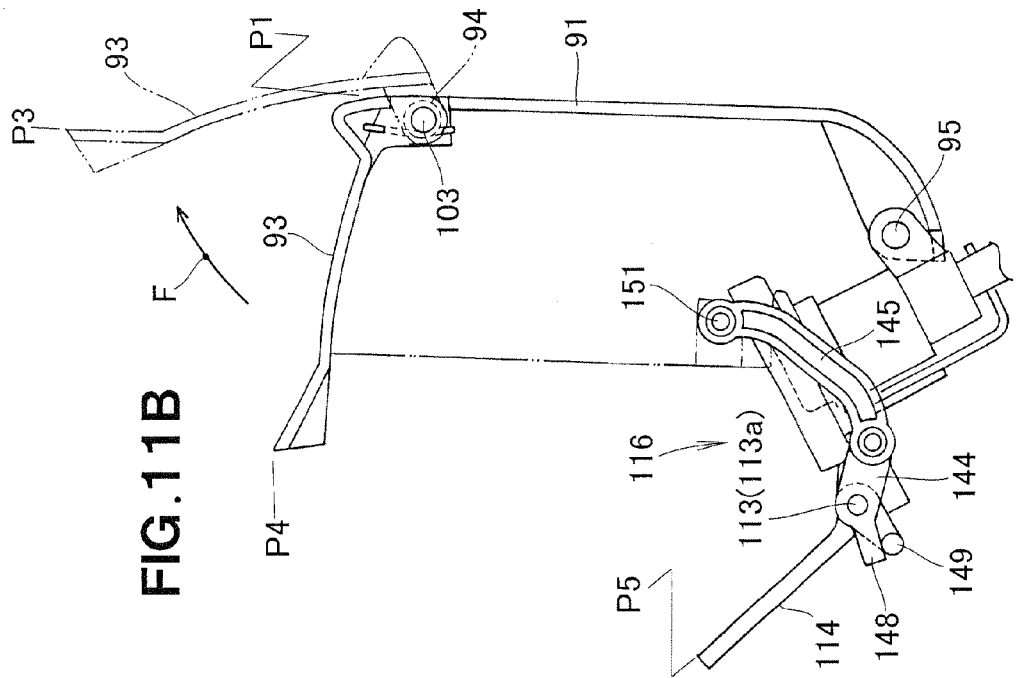
FIGS. 11A and 11B are views explanatory of behavior of the interlocking mechanism when the main cover and shutter member are opened.
Figure 11A:
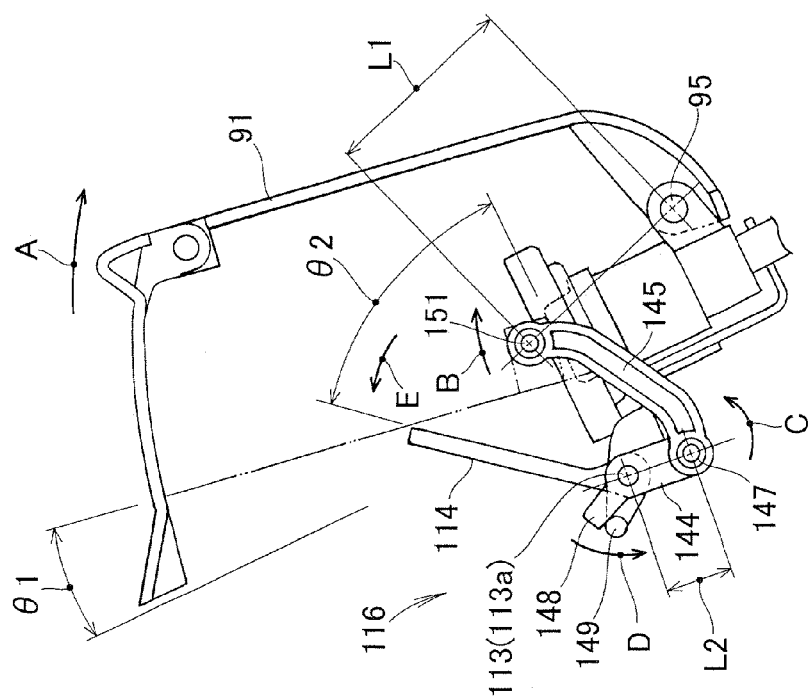

FIGS. 11A and 11B are views explanatory of the behavior of the interlocking mechanism 116 when the main cover 91 and shutter member 114 are opened. As the main cover 91 is caused to pivot through an angle θ1 in the arrow A direction, the shutter member 114 pivots through an angle θ2 in the arrow A direction.

As noted above, the distance L1 between the main pivot shaft 95 and the bolt 151 is about three times as great as the distance L2 between the shutter pivot shaft 113 and the bolt 147. Thus, the pivoting angle θ1 of the main cover 91 may be about one third of the pivoting angle θ2 of the shutter pivot shaft 113.

Then, the main cover 91 is caused to pivot to the opened position P1, in response to which the shutter member 114 pivots to the opened position P5, as shown in FIG. 11B. During that time, the inner link 144 and outer link 145 are brought to the expanded position. Then, the sub cover 93 is caused to pivot upwardly, about the sub pivot shaft 103, from the closed position P4 to the opened position P3 as indicated by arrow F against the biasing force of the sub spring member 94.

FIGS. 12A and 12B illustrate the behavior of the interlocking mechanism 116 after the main cover 91 is closed after the cassette gas canister 18 is attached to the gas canister retaining structure 25. First, as shown in FIG. 13A, the mouthpiece portion 81 of the cassette gas canister 18 oriented upside down is attached and locked to the mouthpiece support section 121 by means of the mouthpiece locking section 122 (see FIG. 4).

After the attachment of the cassette gas canister 18 to the retaining structure 25, the main cover 91 is caused to pivot, via the main spring member 92, from the opened position P1 toward the closed position as indicated by arrow G, in response to which the proximal end portion 145b of the outer link 145 angularly moves together with the main cover 91 via the bolt 151 as indicated by arrow H.

In response to such movement of the outer link 145, the inner link 144 pivots about the shutter pivot shaft 113 as indicated by arrow I, so that the guide claw 148 moves away from the driven pin 149 as indicated by arrow J. As a consequence, the shutter member 114 pivots, by the biasing force of the shutter spring member 115 (see FIG. 5), about the shutter pivot shaft 113 from the opened position P5 toward the closed position as indicated by arrow K.

Then, as shown in FIG. 12B, the shutter 114 pivots so that the distal end portion 114b of the shutter member 114 abuts against the container 19 of the cassette gas canister 18 and is held at the abutting position by the biasing force of the shutter spring member 115 (see FIG. 5). The main cover 91, on the other hand, continues to pivot as indicated by arrow G by the biasing force of the main spring member 92. In interlocked relation to the pivoting movement of the main cover 91, the guide claw 148 continues to move away from the driven pin 149 as indicated by arrow J.

Because the shutter member 114 is currently held at the abutting position, the driven pin 149 too is held stationary, and thus, the guide claw 148 moves away from the guide claw 148.

Figure 13:
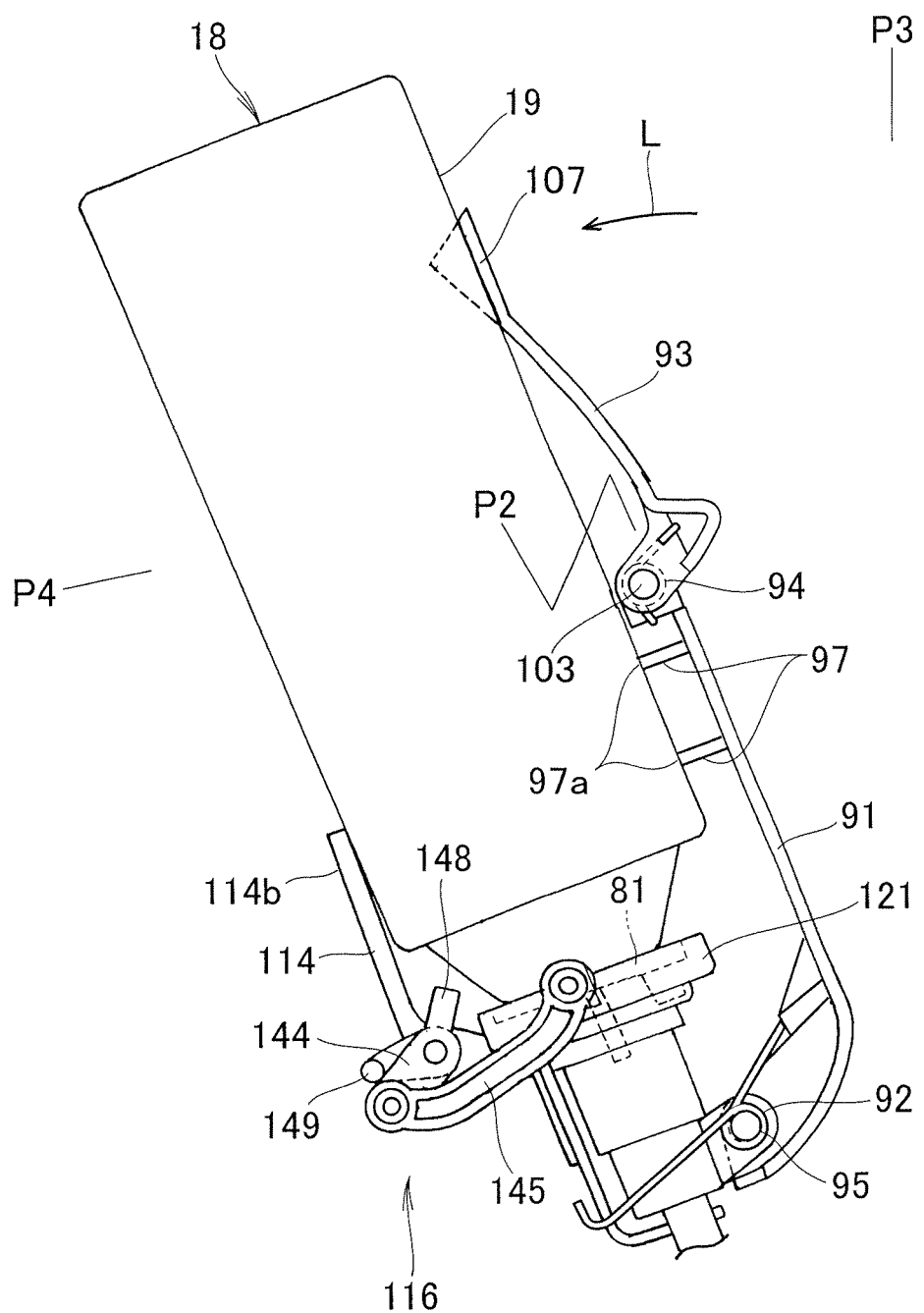
FIG. 13 is a view showing how the cassette gas canister is held by the main cover and sub cover.

FIG. 13 is a view explanatory of how the cassette gas canister is held in place by the main cover 91 and sub cover 93. The main cover 91 pivots to the closed position P2 to thereby abut against the gas canister holder 74, and it is held in the closed position P2 by the biasing force of the main spring member 92. In such conditions, the cassette gas canister 18 is held in abutting engagement with distal end edges 97a of the ribs 97.

Then, the sub cover 93 is caused to pivot, by the biasing force of the sub spring member 94, from the opened position P3 toward the closed position P4 as indicated by arrow L. Thus, the curved protruding portion 107 of the sub cover 93 abuts against the container 19 and is held at the abutting position by the biasing force of the sub spring member 94. In the aforementioned manner, the operation for attaching the cassette gas canister 18 to the gas canister retaining structure 25 is completed.

With the interlocking mechanism 116 constructed in the above-described manner, the shutter member 114 can be opened/closed in interlocked relation to the opening/closing operating of the main cover 91. Thus, there is no need for the human operator to open/close the shutter member 114 separately from the main cover 91, which thereby greatly facilitates the attachment/detachment of the cassette gas canister 18 to/from the retaining structure 25.

Further, according to the above-described embodiment, as the main cover 91 is closed, the guide claw 148 moves from the driven pin 149, and the shutter member 114 is closed by the biasing force of the shutter spring member 115. Thus, even if the distal end portion 114b of the shutter member 114 abuts against the main cover 91 when the main cover 91 is being closed, the guide pin 148 is allowed to move apart from the driven pin 149. Thus, with the above-described simple construction, the interlocking relationship between the main cover 91 and the shutter 114 can be canceled to allow only the main cover 91 to be closed as desired.

Furthermore, by the provision of the interlocking mechanism 116, which permits interlocked operation between the main cover 91 and the shutter member 114 such that opening the main cover 91 through a small angle can cause the shutter member 114 to pivotally move through a much greater angle to the opened position P5 where the shutter member 114 is evacuated from the cassette gas canister 18 and that closing the main cover 91 through a small angle can cause the shutter member 114 to pivotally move through a much greater angle to the closed position P6 where it closes the nozzle receiving port 131. In this way, the instant embodiment can facilitate the opening/closing operation of the main cover 91.

Note that the main cover 91, main spring member 92, sub cover 93, sub spring member 94, shutter member 114, mouthpiece support section 121, nozzle receiving port 131, shutter spring member 115, inner link 144, outer link 145, guide claw 148, driven pin 146, etc. employed in the above-described embodiment are not limited to the shapes and constructions mentioned above or illustrated in the drawings and may be modified as necessary.

The gas canister retaining structure of the present invention is well suited for application to working machines equipped with a gas engine that is supplied with fuel from a cassette gas canister.

Obviously, various minor changes and modifications of the present invention are possible in light of the above teaching. It is therefore to be understood that within the scope of the appended claims the invention may be practiced otherwise than as specifically described.

What is claimed is:

1. A gas canister retaining structure for a gas-engine-mounted working machine provided with a gas engine that is supplied with fuel from a cassette gas canister, said gas canister retaining structure comprising:
    a gas canister cover pivotable between an opened position for attaching/detaching the cassette gas canister to/from said gas canister retaining structure and a closed position for accommodating and holding the cassette gas canister in place within said gas canister cover;
    a mouthpiece support section provided inside said gas canister cover for supporting a mouthpiece portion of the cassette gas canister with a jet nozzle of the cassette gas canister received in a nozzle receiving port provided in said mouthpiece support section;
    a shutter member pivotable between an opened position for opening the nozzle receiving port and a closed position, wherein the shutter member is configured to sealingly engage and close the nozzle receiving port; and
    an interlocking means that causes said shutter member to be opened/closed in interlocked relation to opening/closing of said gas canister cover,
    wherein the interlocking means allows the shutter member to pivot to the closed position and prevents entry of foreign matter into the nozzle receiving port when the gas canister cover pivots to the closed position, and wherein the interlocking means allows the shutter member to pivot to the opened position when the gas canister cover pivots to the opened position; and wherein said interlocking means includes first and second links that interconnect said gas canister cover and said shutter member, and in which, as said gas canister cover is closed, said first and second links are collapsed so that said shutter member is closed, while, as said gas canister cover is opened, said first and second links are expanded so that said shutter member is opened;

wherein the first link is pivotably provided on said gas canister cover and the second link is pivotably provided on said shutter member, and wherein, as said gas canister cover is opened, a guide claw provided on the second link abuts against a driven pin, provided on said shutter member, so that said shutter member is opened, while, as said gas canister cover is closed, the guide claw moves away from the driven pin so that said shutter member is closed by a biasing force of a return spring.

2. The gas canister retaining structure according to claim 1, wherein said gas canister cover and said shutter member are operatively interconnected via said interlocking means.

3. A gas canister retaining structure for a gas-engine-mounted working machine provided with a gas engine that is supplied with fuel from a cassette gas canister, said gas canister retaining structure comprising:

a gas canister cover pivotable between an opened position for attaching/detaching the cassette gas canister to/from said gas canister retaining structure and a closed position for accommodating and holding the cassette gas canister in place within said gas canister cover;

a mouthpiece support section provided inside said gas canister cover for supporting a mouthpiece portion of the cassette gas canister with a jet nozzle of the cassette gas canister received in a nozzle receiving port provided in said mouthpiece support section;

a shutter member pivotable between an opened position for opening the nozzle receiving port and a closed position for closing the nozzle receiving port; and an interlocking means that causes said shutter member to be opened/closed in interlocked relation to opening/closing of said gas canister cover, wherein said interlocking means includes first and second links that interconnect said gas canister cover and said shutter member, and in which, as said gas canister cover is closed, said first and second links are collapsed so that said shutter member is closed, while, as said gas canister cover is opened, said first and second links are expanded so that said shutter member is opened;

wherein the first link is pivotably provided on said gas canister cover and the second link is pivotably provided on said shutter member, and wherein, as said gas canister cover is opened, a guide claw provided on the second link abuts against a driven pin, provided on said shutter member, so that said shutter member is opened, while, as said gas canister cover is closed, the guide claw moves away from the driven pin so that said shutter member is closed by a biasing force of a return spring.

\* \* \* \* \*